United States Patent Office 3,165,542
Patented Jan. 12, 1965

3,165,542
NEW 14-HYDROXY-PREGNANES
Jakob Urech and Ernst Vischer, Basel, and Albert Wettstein, Riehen, Switzerland, assignors to Ciba Corporation, New York, N.Y., a corporation of Delaware
No Drawing. Filed Mar. 27, 1963, Ser. No. 268,446
Claims priority, application Switzerland, Dec. 19, 1960, 14,166/60, 14,167/60
6 Claims. (Cl. 260—397.45)

This is a continuation in part of our applications Serial No. 159,461 and Serial No. 159,460, both filed December 14, 1961, and both now abandoned.

The invention provides new 14α-hydroxy-pregnane compounds of the formula

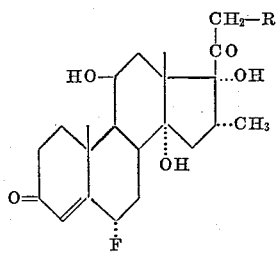

in which R represents a free or esterfied hydroxyl group and the 1-dehydro derivatives thereof.

The new compounds are manufactured by methods as such known; for example by introducing in any desired order of succession the substituents in position 3, 6, 11, 14, 16, 17 and 21, and the 1:2- and/or 4:5-double bond in an appropriate unsubstituted or saturated compound respectively. Inter alia, the Δ⁴-pregnenes of the above formula can be prepared, for example, by subjecting a suitable substituted 11-desoxy pregnane to enzymatic hydroxylation in the 11β-position. This hydroxylation is carried out, for example, with enzymes of microbiological origin, for example with enzymes of the fungus *Cunninghamella elegans* or with enzymes obtained from animal organs, more especially from the suprarenal glands. The Δ¹,⁴-pregnadienes can be made, for example, by dehydrogenation in the 1:2-position of the corresponding substituted Δ⁴-pregnenes saturated in the 1:2-position. The dehydrogenation is carried out, for example, by an enzymatic method, for example, with enzymes of the mold *Corynebacterium simplex* or by a chemical method, for example, with selenium dioxide.

In the esters the acid residues can be e.g. of saturated or unsaturated aliphatic, cycloaliphatic, aromatic or heterocyclic carboxylic acids, preferably of lower aliphatic, monocyclic cycloaliphatic, aromatic or heterocyclic carboxylic acids, lower monocyclic araliphatic or cycloaliphatic carboxylic acids, containing 1–20 carbon atoms, such as, for example, of trimethylacetic acid, acetic acid, propionic acid, butyric acids, valeric acids such as n-valeric acid, caproic acids such as β-trimethyl-propionic acid, oenanthic caprylic, pelargonic, capric, undecylic acids, for example undecylenic acid, lauric, myristic, palmitic or stearic acids, for example oleic acid, cyclopropyl-, cyclobutyl-, cyclopentyl- or cyclohexyl-carboxylic acid, cyclopropylmethylcarboxylic acid, cyclobutylmethylcarboxylic acid, cyclopentylethylcarboxylic acid, cyclohexylethylcarboxylic acid, cyclopentyl-, cyclohexyl- or phenyl-acetic acids or -propionic acids, benzoic acid, phenoxyalkane acids, such as phenoxyacetic acid, parachlorophenoxyacetic acid, 2:4-di-chlorophenoxyacetic acid, 4-tertiary butylphenoxyacetic acid, 3-phenoxypropionic acid, 4-phenoxybutyric acid, furan-2-carboxylic acid, 5-tertiary butyl-furan-2-carboxylic acid, 5-bromo-furan-2-carboxylic acid, of nicotinic acids, β-ketocarboxylic acids, for example acetoacetic, propionylacetic, butyrylacetic or caprinoylacetic acid, of amino acids such as diethylaminoacetic acid, aspartic acid, of dicarboxylic acids, for example oxalic, succinic, maleic, glutaric, dimethylglutaric, pimelic, acetonedicarboxylic, acetylenedicarboxylic, phthalic, tetrahydrophthalic, hexahydrophthalic, endomethylene-tetrahydrophthalic, endomethylene-hexahydrophthalic, endoxy-hexahydrophthalic, endoxy-tetrahydrophthalic, camphoric, cyclopropanedicarboxylic acid, cyclobutanedicarboxylic acid, diglycollic, ethylenebisglycollic, polyethylenebisglycollic acids, thioglycollic acid, furan-, dihydrofuran- and tetrahydrofuran-dicarboxylic acids, quinolic, cinchomeronic acid, as well as of the polyethyleneglycol monoalkyl ether semiesters of the aforementioned dicarboxylic acids. Instead of from carboxylic acids the residues may be derived from sulfonic acids or from phosphoric, sulphuric or hydrohalic acids.

When the product obtained by the present process is a 21-hydroxyl compound, the 21-esters can be prepared, for example, by reaction with the aforementioned acids, their halides, anhydrides, thiol derivatives or ketenes. Transesterification methods are likewise suitable. The watersoluble salts are obtained by treating the semiesters in the known manner, for example with an alkali metal hydroxide, carbonate or bicarbonate, more especially with sodium bicarbonate, or with an organic base such as ethanolamine, diethanolamine, triethanolamine, dibenzylethylenediamine, ephedrine or α-1-phenyl-2-methyl-amino-propane. The semiesters have the special advantage that they form relatively stable aqueous solutions with the aforementioned organic or inorganic bases.

When a resulting compound contains an esterified hydroxyl group, the latter can be converted into a free hydroxyl group by chemical or enzymatic hydrolysis, for example with the use of an acid or basic agent or by transesterification.

The products of the present process are distinguished by their high physiological effect. Thus, they counteract inflammation and are particularly suitable for treating inflammatory processes of the skin, such as dermatoses of various origins, eczema, exanthema and the like.

The starting materials can likewise be prepared by as such known methods, thus, for example the Δ⁴-3:20-dioxo - 6α - fluoro - 16α - methyl-14α:17α:21-trihydroxy-pregnenes from the appropriate compounds not hydroxylated in position 14 with the use, for example, of enzymes of the fungus *Curvularia lunata*. This hydroxylation gives rise to a mixture of Δ⁴-3:20-dioxo-6α-fluoro-16α-methyl-11β:17α:21-trihydroxy - pregnene and Δ⁴ - 3:20-dioxo-6α-fluoro - 16α - methyl - 14α:17α:21 - trihydroxy-pregnene. The compound hydroxylated in position 14α can be separated from the compound hydroxylated in position 11β, for example, by chromatography on silica gel. If desired, the 14α-hydroxyl compounds can be used as starting material in the present process in the form of their esters.

The active principles obtainable by the present process can be used as medicaments, for example in the form of preparations containing said active principles in admixture with a solid or liquid medicinal excipient. The preparations are made by as such methods, for example, with the use of a pharmaceutical organic or inorganic excipient, suitable for parenteral, enteral or topical administration. Suitable excipients are substances that do not react with the new compounds such, for example, as water, vegetable oils, benzyl alcohols, polyethylene glycols, gelatine, lactose, starch, magnesium stearate, talc, white petroleum jelly, cholesterol or other medicinal excipients. More especially, preparations are made which are suitable for parenteral administration, preferably solutions, above all oily or aqueous solutions;

furthermore suspensions, emulsions or implants; for enteral administration there are also made tablets or dragees, and for local administration also ointments or creams. If desired the preparations may be sterilized or they may contain assistants such as preserving, stabilizing, wetting or emulsifying agents, salts for regulating the osmotic pressure or buffers. They may also contain other therapeutically active compounds. They are prepared in the known manner. The content of the active substance in these preparations, such as of an ampoule, is preferably 0.1–200 mg. or 0.03–60% by weight.

The following examples illustrate the invention.

*Example 1*

$\Delta^4$-3:20-dioxo-6$\alpha$-fluoro-16$\alpha$-methyl - 11$\beta$:14$\alpha$:17$\alpha$:21-tetrahydroxy-pregnene can be prepared in the following manner:

(*a*) By enzymatic hydroxylation of $\Delta^4$-3:20-dioxo-6$\alpha$-fluoro-16$\alpha$-methyl-14$\alpha$:17$\alpha$:21 - trihydroxy - pregnene with bovine suprarenal homogenate.

The incubation solution is prepared by mixing 100 parts by volume of "salt solution" with 11 parts by volume of phosphate buffer and 27 parts by volume of sodium fumarate solution.

"*Salt solution.*"—A mixture of 400 cc. of sodium chloride solution of 4.5% strength, 16 cc. of potassium chloride solution of 5.75% strength and 4 cc. of magnesium sulphate heptahydrate solution of 19.1% strength is made up with distilled water to 2 litres.

*Phosphate buffer.*—850 cc. of 0.1-molar solution of secondary potassium phosphate are mixed with 150 cc. of an 0.1-molar solution of primary sodium phosphate.

*Sodium fumarate solution.*—A solution of 17.4 grams of fumaric acid and 12 grams of sodium hydroxide pills in about 800 cc. of distilled water is adjusted to pH= 7.4 by adding a small amount of fumaric acid or dilute sodium hydroxide solution and the solution is made up with distilled water to 1 litre.

220 grams of degreased suprarenal glands of freshly slaughtered cattle are homogenized for 4 minutes at 0° C. with 220 cc. of incubation solution adjusted to pH 7.4 in a Cuisto homogeniser. The homogenate is agitated with a further 220 cc. of the same incubation solution in a round-bottomed flask of 2 litres capacity having a wide neck, then mixed with a solution of 220 mg. of $\Delta^4$-3:20-dioxo-6$\alpha$-fluoro-16$\alpha$-methyl - 14$\alpha$:17$\alpha$:21 - trihydroxy-pregnene in 10 cc. of rectified alcohol and the whole is stirred for 2½ hours at 30° C.

The homogenate is treated with 4.4 litres of acetone, stirred for 14 hours at 0° C. and the solid shreds of tissue are suctioned off. The filter residue is stirred with 4× 220 cc. of aqueous acetone of 80% strength and each time exhaustively suction-filtered. The combined filtrates are concentrated in a water-jet vacuum to about 400 cc. mixed with 200 cc. of acetone and agitated with 220 cc. of hexane. The aqueous acetonic layer is agitated with two further portions of 110 cc. of hexane each and all three hexane solutions are successively back-extracted with four portions of 110 cc. of aqueous acetone of 60% strength (3 parts by volume of acetone, 2 parts by volume of water). The five aqueous acetonic extracts are evaporated in a water-jet vacuum until they are free from acetone and the aqueous concentrate is saturated with sodium chloride and repeatedly extracted with methylene chloride. The methylene chloride extracts are washed with ice-cold dilute sodium bicarbonate solution and with water until neutral, dried with sodium sulphate and evaporated in vacuo to yield 306 mg. of a degreased steroid extract. This extract is subjected to chromatographic separation on 6.12 grams of silica gel (inactivated with 15% by weight of water). After the oily impurities have been eluted with methylene chloride and methylene chloride+acetone (98:2) and (95:5), a 9:1-mixture elutes 37 mg. of starting material, and finally a 4:1-mixture elutes 151 mg. of crude 11$\beta$-hydroxylation product which, after having been recrystallized from a mixture of acetone and petroleum ether (boiling point 50 to 70° C.), yields 118 mg. of $\Delta^4$-3:20-dioxo-6$\alpha$-fluoro-16$\alpha$-methyl-11$\beta$:14$\alpha$:17$\alpha$:21-tetrahydroxy - pregnene melting at 272–274° C. Optical rotation $[\alpha]_D^{25}=+134.7°\pm1°$ (c.= 0.453 in dioxane). The ultra-violet spectrum in ethanol contains a maximum at 237 m$\mu$ ($\epsilon$=15,000). The infrared spectrum in Nujol contains bands at 2.86, 2.93 and 3.01$\mu$ (hydroxyl), 5.82$\mu$ (20-ketone), 5.98 and 6.13$\mu$ ($\Delta^4$-3-ketone).

*Paper Chromatographic Behavior*

| | Temperature, degrees | $R_f$ | $R_S$ (S=hydrocortisone) |
|---|---|---|---|
| Formamide/chloroform | 22 | | 0.52 |
| Formamide/chloroform:dioxane:n-butanol (7:2:1) | 22 | 0.67 | 0.89 |
| Formamide/butyl acetate:water (100:5) | 22 | 0.53 | 1.36 |
| Bush C | 38 | 0.35 | 1.00 |
| Bush B$_5$ | 38 | 0.33 | 0.97 |

Reaction with blue tetrazolium chloride: positive.
Fluorescence with sodium hydroxide solution: yellow.

(*b*) By microbiological hydroxylation of $\Delta^4$-3:20-dioxo-6$\alpha$-fluoro-16$\alpha$-methyl-14$\alpha$:17$\alpha$:21-trihydroxy-pregnene.

Two conical flasks of 500 cc. capacity are charged with 100 cc. each of a nutrient solution containing per litre 2 grams of sodium nitrate, 1 gram of primary potassium phosphate, 0.5 gram of magnesium sulphate heptahydrate, 0.5 gram of potassium chloride, 1 gram of Difco yeast extract, 50 grams of glucose, and 1 cc. of trace elements; each nutrient solution is adjusted to pH 5 and sterilized for 30 minutes under 1.1 atmospheres (gauge) pressure, allowed to cool to 25° C. and inoculated with a suspension of spores of *Cunninghamella elegans*. After 27 hours the cultures in the flasks which are then in the first stage of their growth are transferred to two shaking vessels of 10 liters capacity which contain 4 liters each of the same nutrient solution. While shaking the vessels with their contents for 2 days and introducing air warmed at 27° C. copious globular colonies of the fungus develop, whereupon, likewise under sterile conditions, a solution each of 1.19 grams of $\Delta^4$-3:20-dioxo-6$\alpha$-fluoro-16$\alpha$-methyl-14$\alpha$:17$\alpha$:21-trihydroxy-pregnene in 50 cc. of acetone is introduced into the vessels. The progress of the reaction is checked by taking liquid samples under sterile conditions and subjecting them to paper chromatographic examination. After 90 hours the two cultures are suctioned off, the mycelium is squashed and washed with ethyl acetate, and the culture filtrate is saturated with sodium chloride and extracted with three portions of 8.6 and 4 liters of ethyl acetate. The extracts are washed with two liters of sodium chloride solution of 10% strength, dried with sodium sulfate and evaporated in a water-jet vacuum. The partially oily residue amounting to 4.65 grams is chromatographed on 70 grams of silica gel (inactivated with 15% by weight of water) as described under (*a*) above. In addition to 1.632 grams of starting material there is obtained 0.452 gram of $\Delta^4$-3:20-dioxo-6$\alpha$-fluoro - 16$\alpha$ - methyl - 11$\beta$:14$\alpha$:17$\alpha$:21 - tetrahydroxy-pregnene melting at 272 to 274.5° C., the behaviour of which is identical with that of the product prepared as described under (*a*) above.

Instead of $\Delta^4$ - 3:20 - dioxo - 6$\alpha$ - fluoro - 16$\alpha$ - methyl-14$\alpha$:17$\alpha$:21-trihydroxy-pregnene itself its corresponding 21-acetate may be used as starting material.

These starting materials are prepared in the following manner:

A shaking vessel of 10 liter capacity charged with 4 liters of a nutrient solution containing 40 grams of glucose, 40 grams of Difco Tryptone, 8 grams of sodium nitrate, 4 grams of secondary potassium phosphate, 2 grams of magnesium sulphate heptahydrate, 2 grams of potassium chloride and 40 mg. of ferrous sulphate heptahydrate is sterilized for 30 minutes under a pressure of 1.1 atmospheres (gauge), allowed to cool to room temperature and then inoculated with 2 cc. of a suspension of spores of *Curvularia lunata* (NRRL 2380). The whole is shaken for 4 days at 25 to 27° C. while passing over a current of air and the dark-grey to black mycelium is suctioned off and washed with a total of 5 litres of desalted water. The washed mycelium is then suspended in the same shaking vessel in 4 litres of aqueous sodium chloride solution of 1% strength, the culture is mixed with a solution of 1 gram of $\Delta^4$-3:20-dioxo - 6$\alpha$ - fluoro - 16$\alpha$ - methyl - 17$\alpha$:21 - dihydroxy-pregnene in 30 cc. of rectified alcohol and then allowed to incubate while being shaken for 48 hours under the above-mentioned temperature and aeration conditions.

The culture is then suctioned off, the mycelium is washed with three portions of 2 litres each of ethyl acetate and the culture filtrate is extracted with the ethyl acetate washings. The extracts are washed with sodium chloride solution of 10% strength, dried with sodium sulphate and then evaporated in a water-jet vacuum to leave 1.23 grams of a partially crystalline residue which is chromatographed on 30 grams of silica gel (inactivated with 15% by weight of water). Methylene chloride elutes a red oil which is not of steroid nature. The fractions eluted with a 95:5-mixture of methylene chloride and acetone contain starting material, while the final fraction contains $\Delta^4$ - 3:20 - dioxo - 6$\alpha$ - fluoro - 16$\alpha$-methyl-14$\alpha$:17$\alpha$:21-trihydroxy-pregnene. 9:1- and 4:1-mixtures of methylene chloride and acetone elute the main reaction product $\Delta^4$ - 3:20 - dioxo - 6$\alpha$ - fluoro-16$\alpha$-methyl-11$\beta$:17$\alpha$:21-trihydroxy-pregnene. By recrystallisation from acetone+ether there are obtained, (a) 136 mg. (13.6%) of starting material, melting at 174–181.5°, (b) 42 mg. (4.0%) $\Delta^4$-3:20-dioxo-6$\alpha$-fluoro-16$\alpha$-methyl-14$\alpha$:17$\alpha$:21-trihydroxy-pregnene, melting at 247–251° C. Optical rotation $[\alpha]_D^{24}$=124.4±1.6° (c.=0.418 in dioxane). The ultra-violet spectrum in ethanol displays a maximum at 237 m$\mu$ ($\epsilon$=15,650). The infrared spectrum in Nujol contains bands at 2.87, 2.95 and 3.01$\mu$ (hydroxyl), 5.84$\mu$ (20-ketone), 5.99 and 6.14$\mu$ ($\Delta^4$-3-ketone).

*Paper Chromatographic Behaviour*

|  | Temperature, °C. | $R_f$ | $R_s$ (S=corticosterone) |
|---|---|---|---|
| Formamide/benzene:chloroform (1:1) | 22 | 0.29 | 0.57 |
| Formamide/chloroform | 22 | 0.68 | 0.83 |
| Bush C | 38 | 0.75 | 0.98 |
| Bush B$_3$ | 38 | 0.77 | 0.94 |

Reaction with blue tetrazolium chloride: positive.
Fluorescence with sodium hydroxide solution: yellow.

(c) 714 mg. (68.5%) of $\Delta^4$-3:20-dioxo-6$\alpha$-fluoro-16$\alpha$-methyl - 11$\beta$:17$\alpha$:21 - trihydroxy - pregnene melting at 2.16.5–218.5° C. Optical rotation $$[\alpha]_D = +109.6° \pm 1.4°$$

(c.=0.466 in dioxane). The ultra-violet spectrum displays a maximum at 239 m$\mu$ ($\epsilon$=16,000).

A mixture of 42 mg. of $\Delta^4$-3:20-dioxo-6$\alpha$-fluoro-16$\alpha$-methyl-14$\alpha$:17$\alpha$:21-trihydroxy-pregnene, 1.4 cc. of absolute pyridine and 0.5 cc. of acetic anhydride is kept overnight at 25° C. The reaction solution is then treated with ice, kept for 1½ hours in an ice bath, the acetylation product is repeatedly extracted with methylene chloride, and the extracts are washed successively with dilute hydrochloric acid, ice-cold sodium bicarbonate solution of 2% strength and water until neutral, dried with sodium sulphate and the solvent is evaporated in a water-jet vacuum. On recrystallisation from acetone+ether the residue yields 39 mg. of the 21-acetate of $\Delta^4$ - 3:20 - dioxo - 6$\alpha$ - fluoro - 16$\alpha$ - methyl - 14$\alpha$:17$\alpha$:21-trihydroxy-pregnene melting at 252 to 253.5° C. Optical rotation $[\alpha]_D^{25}$=+113.5°±1.5° (c.=0.511 in dioxane). The ultra-violet spectrum in ethanol contains a maximum at 237 m$\mu$ ($\epsilon$=16,400).

*Paper Chromatographic Behaviour*

|  | Temperature, °C. | $R_f$ | $R_s$ (S=11-desoxycorticosterone) |
|---|---|---|---|
| Formamide/cyclohexane-benzene (1:4) | 22 | 0.52 | 0.69 |
| Formamide/benzene | 22 | 0.65 | 0.84 |
| Bush B$_3$ | 38 | 0.29 | 0.57 |
| Bush B$_1$ | 38 | 0.58 | 0.83 |

Reaction with blue tetrazolium chloride: positive.
Fluorescence with sodium hydroxide solution: yellow.

EXAMPLE 2

470 mg. of $\Delta^4$-3:20-dioxo-6$\alpha$-fluoro-16$\alpha$-methyl-11$\beta$:14$\alpha$:17$\alpha$:21-tetrahydroxy-pregnene in 9 cc. of absolute pyridine are added dropwise within 8 minutes to a solution of 500 mg. of trimethylacetyl chloride in 10 cc. of absolute pyridine in a current of nitrogen with stirring and ice-cooling. The clear solution is kept for 75 minutes at 0° C., 170 cc. of ice water and ice are added to the reaction mixture and the whole is stirred for 1¾ hours while externally cooling with ice. The reaction mixture is repeatedly extracted with methylene chloride and the extracts are washed successively with ice-cold 2 N-hydrochloric acid, ice-cold sodium bicarbonate solution of 2% strength and water until neutral, dried with sodium sulphate and evaporated under reduced pressure. The residue—575 mg. of crude 21-trimethylacetate of $\Delta^4$ - 3:20 - dioxo - 6$\alpha$ - fluoro - 16$\alpha$ - methyl - 11$\beta$:14$\alpha$:17$\alpha$:21-tetrahydroxy-pregnene—is recrystallized from acetone+petroleum ether (boiling at 50 to 70° C.) and melts at 263 to 266° C. with decomposition. The ultra-violet spectrum in ethanol contains a maximum at 237 m$\mu$ ($\epsilon$=15,200). The infra-red spectrum in Nujol contains bands at 2.93 and 3.01$\mu$ (hydroxyl), 5.79$\mu$ (20-ketone), 6.01 and 6.15$\mu$ ($\Delta^4$-3-ketone).

*Paper Chromatographic Behaviour*

|  | Temperature, °C. | $R_f$ | $R_s$ (S=11-desoxycorticosterone) |
|---|---|---|---|
| Bush A | 38 | 0.18 | 0.66 |
| Propylene glycol/toluene | 22 | 0.54 | 0.69 |
| Bush B$_3$ | 38 | 0.57 | 1.07 |
| Formamide/benzene | 22 | 0.70 | 0.83 |
| Bush B$_1$ | 38 | 0.80 |  |

Reaction with blue tetrazolium chloride: very weak, setting in only after 5 to 6 minutes.
Fluorescence with sodium hydroxide solution: yellow.

EXAMPLE 3

Ten 500 ml. Erlenmeyer flasks each containing 100 ml. of a nutrient solution containing, per liter, 1 gram of Difco yeast extract, 4.4 grams of primary potassium phosphate and 8.8 grams of secondary sodium phosphate and adjusted to a pH-value of 7.0, are sterilized for 30 minutes under a pressure of 1.1 atmospheres gauge, then inoculated with a suspension of *Corynebacterium simplex* and agitated for 28 hours. 300 mg. of $\Delta^4$-3:20-dioxo-6$\alpha$-fluoro-16$\alpha$-methyl-11$\beta$:14$\alpha$:17$\alpha$:21-tetrahydroxy - pregnene dissolved in 30 ml. of a mixture of acetone and rectified spirit (2:1) are simultaneously added to all the flasks under sterile conditions and the whole are incubated for 19 hours at 26 to 28° C., while agitating. For the purpose of working up the turbid culture solutions are mixed together, then saturated with sodium chloride and extracted with 700, 500 and 500 ml. of ethyl acetate. The ethyl acetate extracts are washed with sodium chloride solution of 10% strength and dried with sodium sulfate and evaporated to dryness under the pressure of a water jet pump. The amorphous colorless residue, amounting to 292 mg., is recrystallized from a mixture of acetone and petroleum ether (boiling at 50 to 70° C.). The mother liquors are purified on 20 times their weight of de-activated silica gel containing 15% by weight of water, eluted with a mixture of methylene chloride and acetone (4:1), and the elute is recrystallized from a mixture of acetone and ether or acetone and petroleum ether. There are obtained a total of 235 mg. of $\Delta^{1:4}$-3:20-dioxo-6α-fluoro-16α-methyl-11β:14α:17α:21-tetrahydroxy - pregnadiene melting at 263.5 to 265.5° C. The ultra-violet spectrum of the latter product in ethanol shows a maximum at 242 mμ ε=16,800. Its infra-red spectrum in Nujol shows bands at 2.85, 2.95 and 3.09μ (hydroxyl), 5.85μ (20-ketone), 6.00, 6.18 and 6.25μ ($\Delta^{1:4}$-3-ketone).

*Paper chromatographic behaviour*

| | Temperature, degrees | $R_f$ | $R_S$ (S=hydrocortisone) |
|---|---|---|---|
| Bush C | 38 | 0.29 | 0.74 |
| $E_2B$ | 38 | 0.59 | 1.00 |

Formamide/chloroform (8 hours) 22° uniform.
Reaction with blue tetrazolium chloride: positive.
Fluorescence with caustic soda solution: negative.

EXAMPLE 4

To a mixture of 0.5 ml. of trimethyl-acetyl chloride and 6 ml. of absolute pyridine there are added dropwise in the course of 8 minutes, while stirring and cooling with ice, in a current of nitrogen 159 mg. of $\Delta^{1:4}$-3:20-dioxo-6α-fluoro-16α-methyl-11β:14α:17α:21-tetrahydroxy - pregnadiene in 10 ml. of absolute pyridine. The clear solution is allowed to stand for 1 hour and a quarter at 0° C., then 170 ml. of ice-water and ice are added to the reaction mixture, and the whole is stirred for 1 and three-quarter hours while cooling externally with ice. The mixture is extracted several times with methylene chloride, the extracts are washed with ice-cold 2 N-hydrochloric acid, ice-cold sodium hydrogen carbonate solution of 2% strength and water until neutral, then dried with sodium sulfate and evaporated under reduced pressure. The resulting 21-trimethyl-acetate of $\Delta^{1:4}$-3:20-dioxo-6α-fluoro-16α-methyl-11β:14α:17α:21-tetra-hydroxy-pregnadiene is recrystallized from a mixture of acetone and ether, and then melts at 266 to 268° C. Its ultra-violet spectrum in ethanol has a maximum at 242 mμ, ε=15,600. Its infrared spectrum in Nujol has bands at 2.90, 2.95 and 3.04μ (hydroxyl), 5.77μ (20-ketone), 6.03, 6.20 and 6.25μ ($\Delta^{1:4}$-3-ketone).

*Paper chromatographic behaviour*

| | Temperature, degrees | $R_f$ | $R_S$ (S=11-desoxycorticosterone) |
|---|---|---|---|
| Propylene glycol/toluene | 22 | 0.28 | 0.39 |
| Formamide/benzene | 22 | 0.65 | 0.78 |
| Bush $B_1$ | 38 | 0.72 | 0.95 |
| Bush A | 38 | 0.13 | 0.60 |
| Bush $B_3$ | 38 | 0.47 | 0.93 |

Reaction with blue tetrazolium chloride: retarded and very weak.
Fluorescence with caustic soda solution: negative.

What is claimed is:
1. A compound of the formula

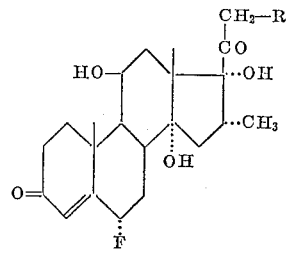

in which R stands for a member selected from the group consisting of a free hydroxyl group and a hydroxyl group esterified with an acid selected from the group consisting of a carboxylic acid, a sulfonic acid, a phosphoric acid, a sulfuric acid and a hydrohalic acid.

2. $\Delta^4$-3:20-dioxo-6α-fluoro-16α-methyl-11β:14α:17α:21-tetrahydroxy-pregnene.

3. The 21-trimethylacetate of $\Delta^4$-3:20-dioxo-6α-fluoro-16α-methyl-11β:14α:17α:21-tetrahydroxy-pregnene.

4. A compound of the formula

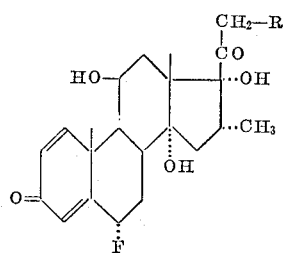

in which R stands for a member selected from the group consisting of a free hydroxyl group and a hydroxyl group esterified with an acid selected from the group consisting of a carboxylic acid, a sulfonic acid, a phosphoric acid, a sulfuric acid and a hydrohalic acid.

5. $\Delta^{1:4}$-3:20-dioxo-6α-fluoro-16α-methyl - 11β:14α:17α:21-tetrahydroxy-pregnadiene.

6. The 21-trimethylacetate of $\Delta^{1:4}$-3:20-dioxo-6α-fluoro-16α-methyl-11β:14α:17α:21-tetrahydroxy-pregnadiene.

No references cited.